United States Patent [19]

Kwasnik et al.

[11] Patent Number: 5,116,099

[45] Date of Patent: May 26, 1992

[54] MECHANICAL LATCH LOCKING A COVER OF PIVOTING ARMREST ASSEMBLY

[75] Inventors: Kenneth Kwasnik, Kalamazoo; David J. Harrell, Royal Oak, both of Mich.

[73] Assignee: Lear Seating Corporation, Southfield, Mich.

[21] Appl. No.: 700,577

[22] Filed: May 14, 1991

[51] Int. Cl.[5] ............................................. A47C 7/62
[52] U.S. Cl. ........................................ 297/194; 297/417;
16/360; 292/91; 312/235.6
[58] Field of Search ............... 297/194, 113, 115, 411,
297/417, 421, 422; 292/91, DIG. 6, DIG. 5, 58,
59, 82, 83, 64, 65, 68, 69; 312/235.6; 16/360,
357, 232, 231

[56] References Cited

U.S. PATENT DOCUMENTS

| | | | |
|---|---|---|---|
| 4,674,790 | 6/1987 | Johnson | 297/194 X |
| 4,709,949 | 12/1987 | Umezawa et al. | 292/91 X |
| 4,848,627 | 7/1989 | Maeda et al. | |
| 4,906,044 | 3/1990 | Wilstermann | |
| 4,953,259 | 9/1990 | Frye et al. | 16/360 X |

FOREIGN PATENT DOCUMENTS

3143957  5/1983  Fed. Rep. of Germany ...... 297/194

Primary Examiner—Joseph Falk
Assistant Examiner—James M. Gardner
Attorney, Agent, or Firm—Reising, Ethington, Barnard, Perry & Milton

[57] ABSTRACT

A vehicle seat armrest assembly (10) includes a lower bin (18) defining a storage compartment (20) and an upper cover (22) hinged to the bin (18) for pivotal movement between a closed position covering the bin (18) and an open position opening the storage compartment (20). A bracket (26) supports the lower bin (18) and provides rotation of the bin (18) between a horizontal use position and a vertical storage position. A latch (40) latches the cover (22) to the bin (18) in a latched position and allows opening of the cover (22) in an unlatched position. A lock (42) interacts between the bracket (26) and the latch (40) to maintain the latch (40) in the latched position in response to pivotal movement of the bin (18) from the horizontal use position to the vertical storage position. The lock (42) includes a cam (60) which transfers the rotational movement of the bin (18) to linear movement of a controller (46). The controller (46) actuates a crank (54) to rotate a locking block (44) into engagement with the latch (40) to maintain the latch (40) in the latched position.

23 Claims, 4 Drawing Sheets

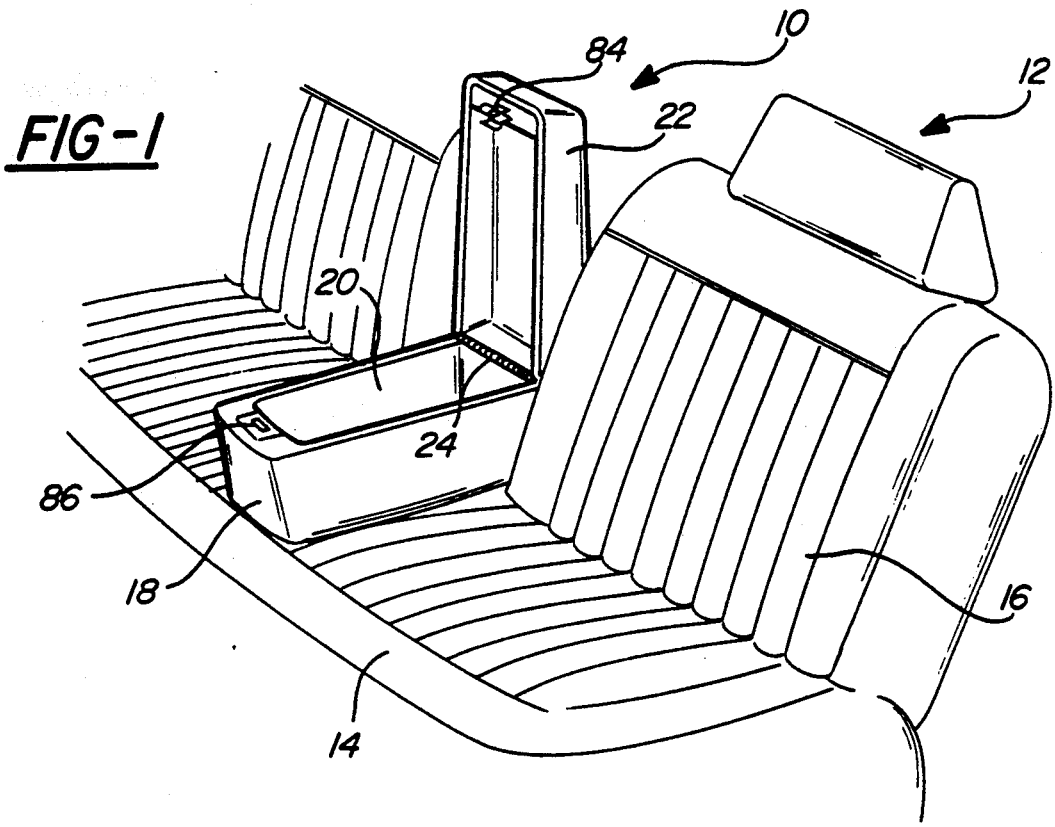
FIG-1
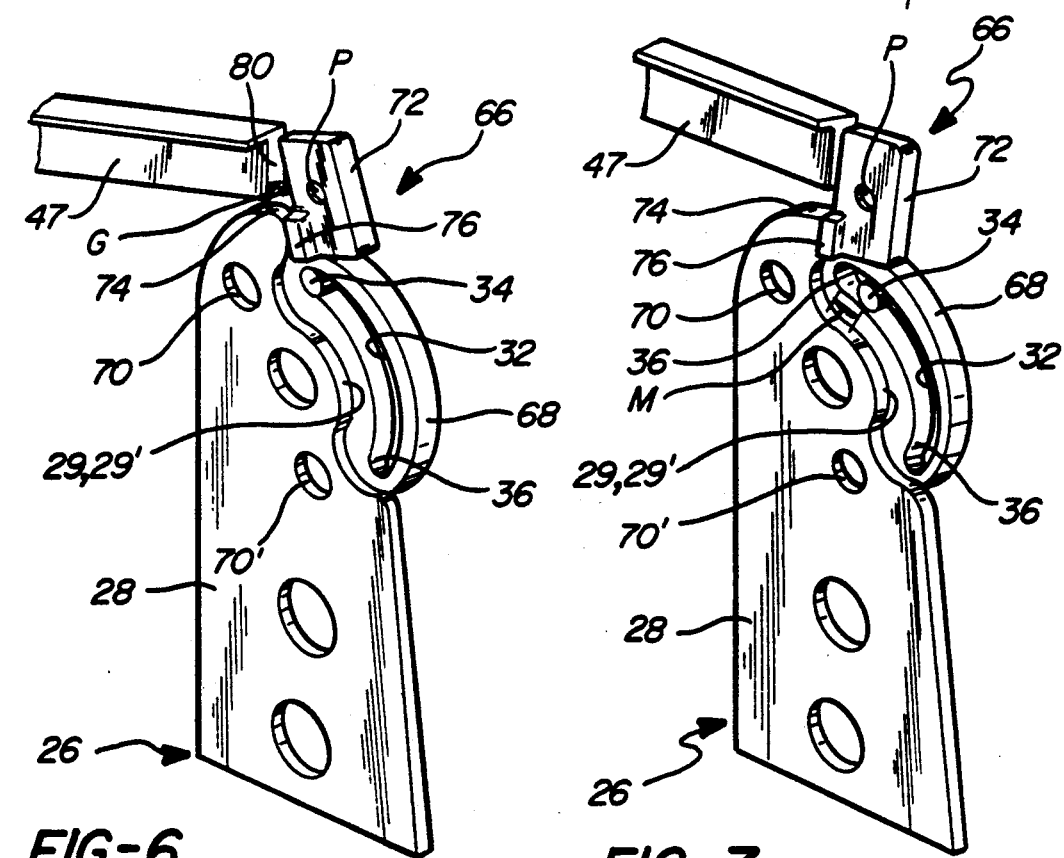
FIG-6
FIG-7

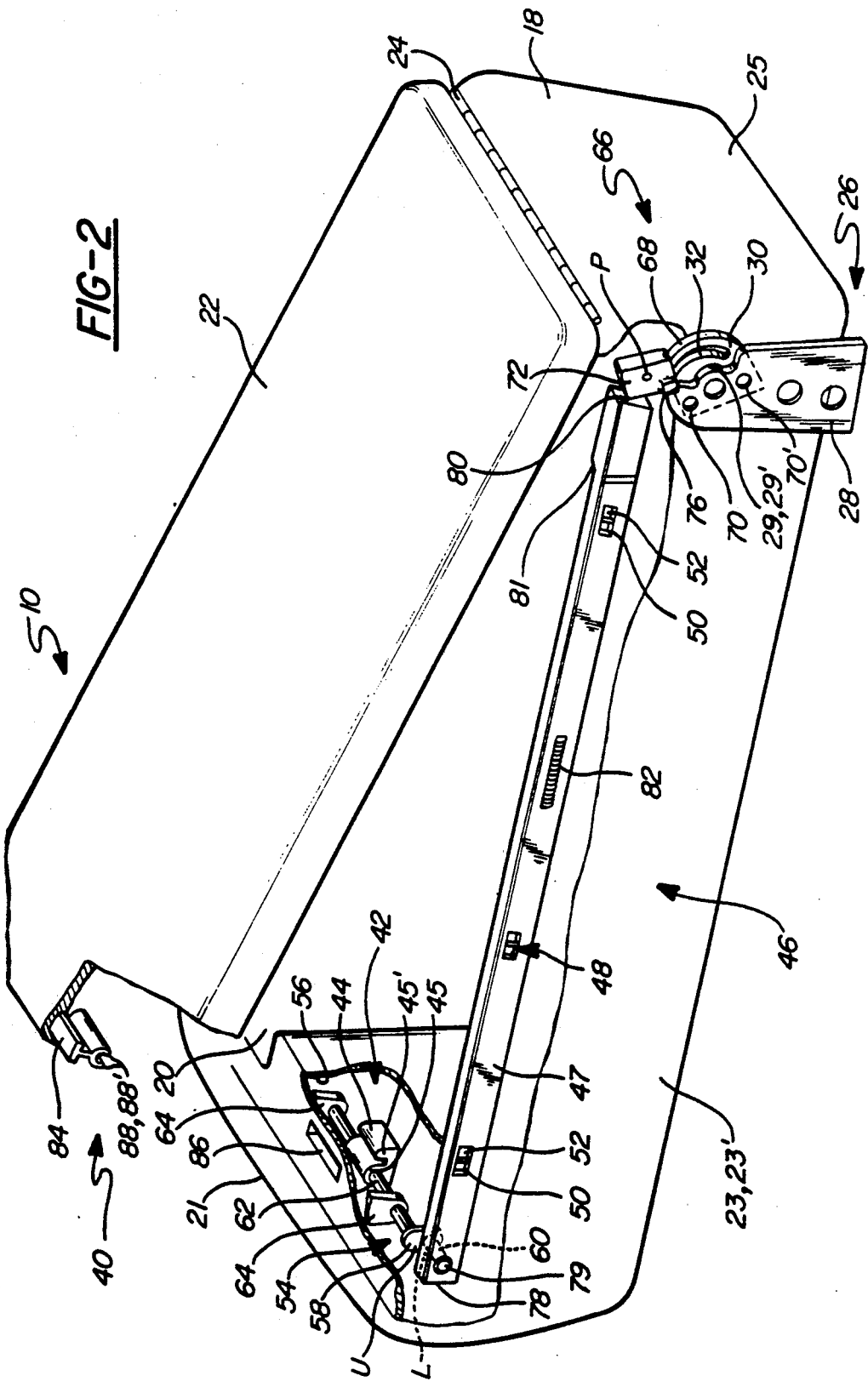

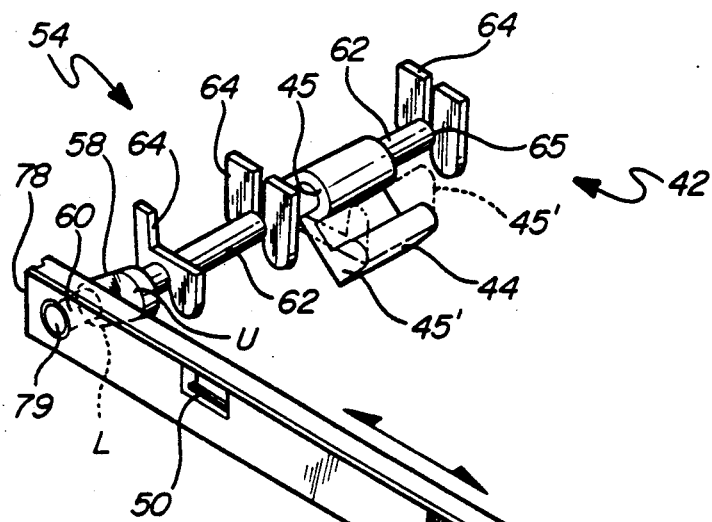
FIG-3
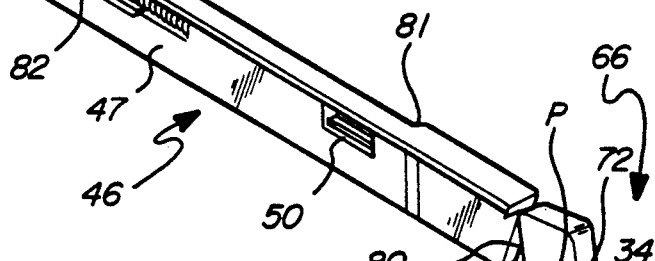
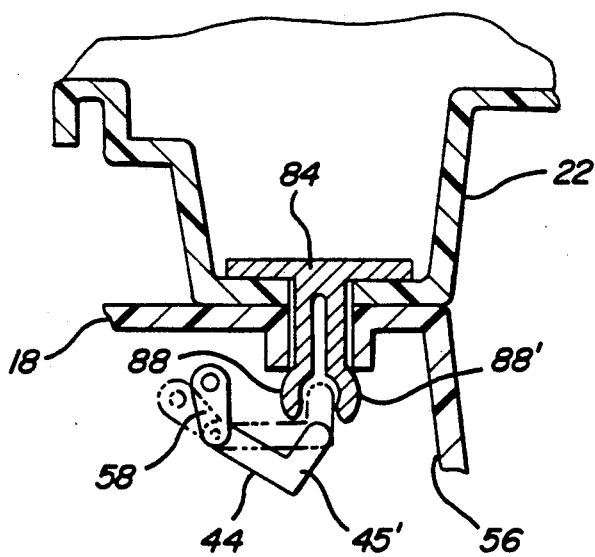
FIG-5
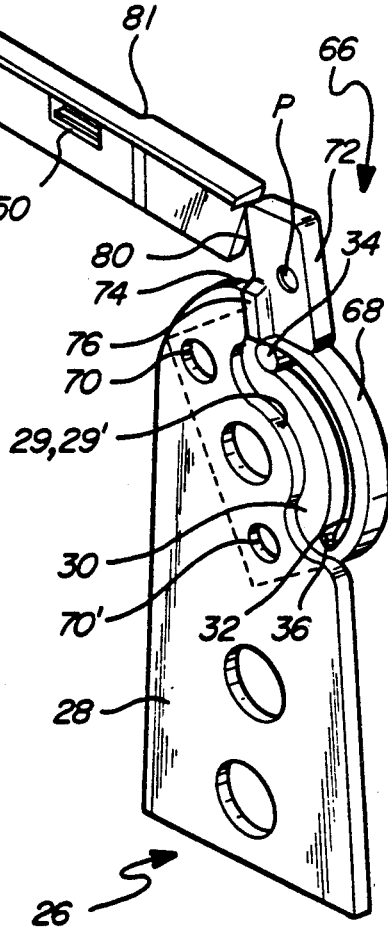

MECHANICAL LATCH LOCKING A COVER OF PIVOTING ARMREST ASSEMBLY

FIELD OF THE INVENTION

The subject invention relates generally to a vehicle armrest assembly, and more specifically, to an armrest assembly having a latch that is maintained in a latched position when the armrest is moved from a use position to a storage position.

DESCRIPTION OF THE RELATED ART

Frequently known in the art are vehicles having an armrest assembly mounted to a seat assembly to provide a comfortable forearm rest to the driver and/or passenger. The armrest is generally pivotal between a horizontal use position and a vertical storage position. Often, the armrest assembly comprises a lower bin defining a storage compartment and an upper cover hinged to the lower bin for covering the bin in a closed position and opening the storage compartment in a open position. The user frequently uses the storage compartment for storing articles such as cassette tapes, compact discs, coins, or the like.

As can be appreciated, it is important to provide a latch between the cover and the bin to maintain the cover latched to the bin when the armrest is pivoted from the horizontal use position to the vertical storage position.

The U.S. Pat. No. 4,906,004 to Wilstermann, issued Mar. 6, 1990, discloses a vehicle armrest comprising a housing defining a storage compartment and a cover pivotally mounted to the housing for covering the storage compartment. The armrest is pivotal about a pivot between a horizontal position and a vertical position. A latch is provided to latch the cover to the housing in a closed position. The latch includes a latch hook which hooks over a flange of the housing. The armrest includes a blocking device which prevents the latch from being unlatched when the armrest is in the vertical position. The blocking device is comprised of a ball which is seated in a receptacle in the housing. Pivotal movement of the armrest to the vertical position causes the ball to roll out of the receptacle and engage with the latch hook and prevent disengagement of the hook from the flange of the housing. The ball is induced to roll simply by the force of gravity, thus, it does not fully engage with the latch hook until the armrest reaches near the vertical position.

The U.S. Pat. No. 4,848,627 to Maeda et al, issued Jul. 18, 1989, discloses an armrest comprising a main box defining a storage compartment and a cover lid for covering the storage compartment. The lid has a lock member comprising a hook and an operating portion. The hook of the lock member is received in an aperture in the main box and the hook engages a flange in the aperture to latch the lid to the box. The lock member is disengaged by pulling on the operating portion to move the hook out of engagement with the flange and allow opening of the lid.

It remains desirable to provide a latch which maintains the cover latched to the bin upon rotation of the bin from the horizontal use position to the vertical storage position and which is activated by this rotation such that the latching occurs at a predetermined position above the horizontal position yet prior to the vertical position.

SUMMARY OF THE INVENTION

In accordance with the present invention, there is provided a vehicle seat armrest assembly comprising a lower bin defining a storage compartment, an upper cover for covering the lower bin and a cover hinge means hinging the cover to the bin for pivotal movement of the cover relative to the bin between a closed position covering the bin and an open position opening the storage compartment. A bracket means supports the lower bin for providing rotation of the bin between a horizontal use position and a vertical storage position. Further included is a latch means for latching the cover to the lower bin in a latched position and allowing opening of the cover in an unlatched position. The assembly is characterized by including locking means interacting between the bracket means and the latch means for maintaining the latch means in the latched position in response to pivotal movement of the bin to a predetermined position above the horizontal use position toward the vertical storage position so that the cover remains latched to the bin in all positions above the predetermined position.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a perspective view of an armrest assembly disposed for use with a vehicle seat assembly;

FIG. 2 is a perspective view of the subject invention of FIG. 1 shown in partial cross-section;

FIG. 3 is a perspective view of the locking means of FIG. 2 in an unlatched position;

FIG. 5 is a partial cross-sectional view of the latch means of FIG. 2;

FIG. 6 is an enlarged perspective view of the guide means of FIG. 2 in the unlatched position; and FIG. 7 is an enlarged perspective view of the guide means of FIG. 2 in the latched position;

DETAILED DESCRIPTION OF THE PREFERRED EMBODIMENT

Figure 4:
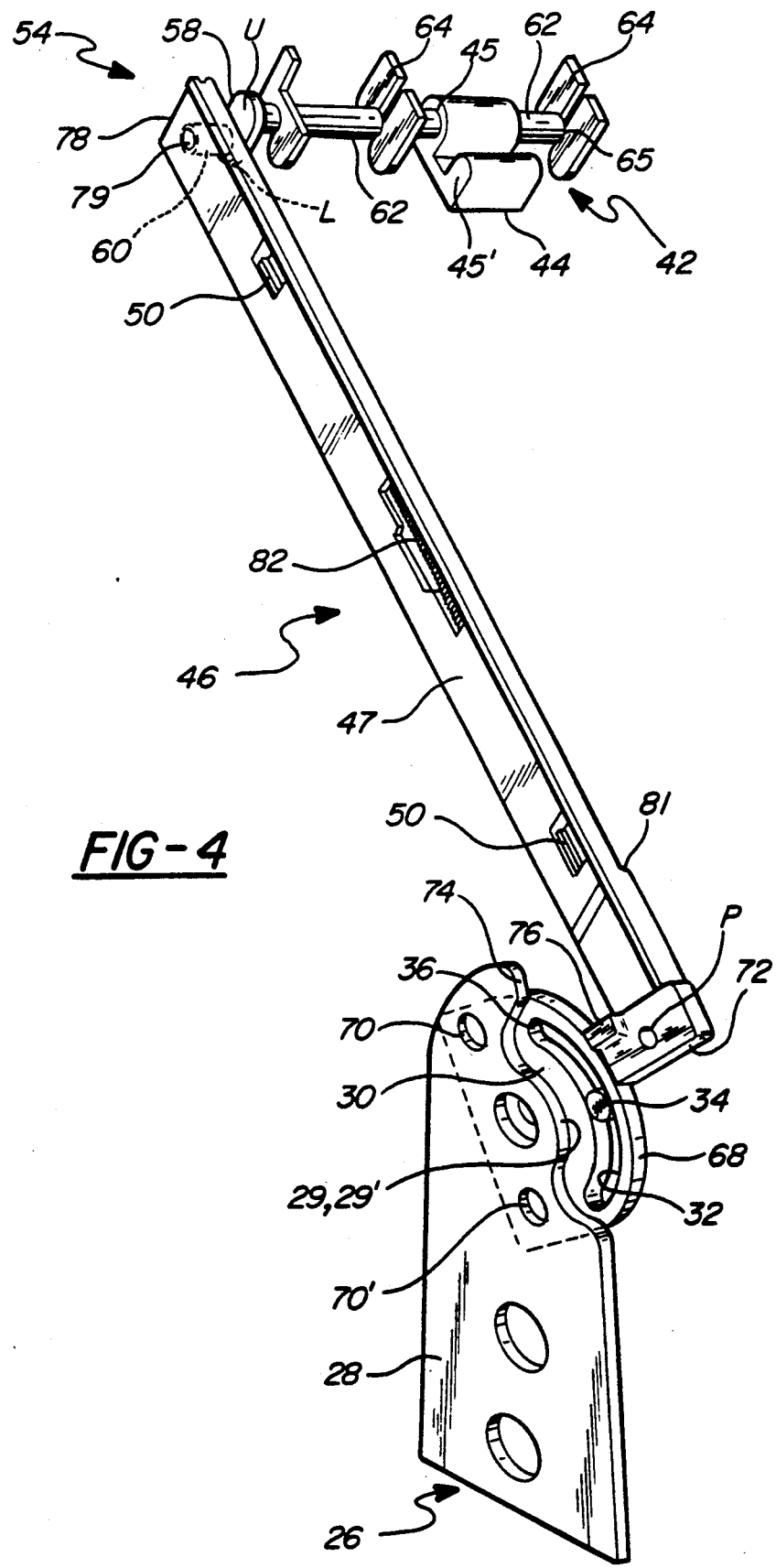
FIG. 4 is a perspective view of the locking means of FIG. 2 in a latched position.

Referring to the Figures wherein like numerals indicate like or corresponding parts throughout the several views, a vehicle seat armrest assembly is generally shown at 10 in FIG. 1. The armrest assembly 10 is generally mounted in association with a vehicle seat assembly as shown at 12. The assembly 12 generally includes a generally horizontal seat portion 14 and a generally vertical backrest portion 16. The seat armrest assembly 10 is generally mounted between two back portions 16 and pivotal between a generally horizontal position parallel with the seat portion 14 and a vertical position generally parallel to the back portion 16.

The seat armrest assembly 10 is generally of molded plastic material and includes a lower bin 18 defining a storage compartment 20 therein. The lower bin 18 comprises a front wall 21, side walls 23, 23' and a back wall 25 further defining the storage compartment 20. The armrest 10 further includes an upper cover 22 for covering the lower bin 18 and a cover hinge means 24 hinging the cover 22 to the bin 18 for providing pivotal movement of the cover 22 relative to the bin 18 between a closed position covering the bin 18 and an open position opening the storage compartment 20, as shown in FIG. 1. The lower bin 18 and upper cover 22 of the armrest 10 are generally covered by a foam padding and upholstery material (not shown), as commonly known in the art, to provide a comfortable forearm rest over a prolonged period of use.

The armrest 10 is mounted to the seat assembly 12 by bracket means 26. The bracket means 26 pivotally supports the lower bin 18 and provides rotation of the armrest 10 between a horizontal use position, generally parallel to the seat portion 14, and a vertical storage position, generally parallel to the backrest portion 16. The bracket means 26 generally includes a frame 28 extending on opposite sides of the lower bin 18. The frame 28 includes support portions 29, 29' disposed adjacent each side of the bin 18 and a guide member 30 seated in each support portion 29, 29' between the frame 28 and the side of the bin 18. The guide member 30 comprises an arcuate slot 32 and the bin includes a guide pin 34 extending outwardly therefrom and seated in the slot 32 of the guide member 30 to rotatably guide the armrest 10 between the horizontal use position and the vertical storage position. The guide member 30 and guide pin 34 effectively establish the limits of travel for the armrest assembly 10. In order for the user to recognize the two positions of the armrest 10, opposites ends of the arcuate slot 32 are formed with enlarged openings 36. The guide pin 34 is dimensioned so as to loosely fit into the enlarged openings 36 at each end of the arcuate slot 32 and tightly fit in the central regions of the slot 32 to provide feedback of a stopping point upon reaching the vertical or horizontal positions of the armrest 10.

The armrest assembly 10 further includes latch means 40 for latching the cover 22 to the lower bin 18 in a latched position and allowing opening of the cover 20 in an unlatched position, as shown in FIG. 1. The armrest assembly 10 may be characterized by including locking means 42 interacting between the bracket means 26 and the latch means 40 for maintaining the latch means 40 in the latched position in response to pivotal movement of the lower bin 18 to a predetermined position above the horizontal use position toward the vertical storage position, so that, the cover 22 remains latched to the lower bin 18 in all positions above this predetermined position. The locking means 42 ensures that the cover 22 becomes locked to the lower bin 18 upon minimal movement of the armrest assembly 10 from the horizontal use position toward the vertical storage position, so that, articles stored within the storage compartment 20 will not be discarded from the armrest assembly 10.

The locking means 42 includes a locking block 44 pivotally coupled to the bin 18 for interlocking engagement with the latch means 40. The locking block 44 is generally U-shaped with a first portion 45 comprising the pivot point and a second portion 45' engaging with the latch means 40. A controller means 46 is disposed along one of the side walls 23, 23' of the bin 18 between the front wall 21 and the bracket means 26, adjacent the back wall 25, for controlling the pivotal movement of the locking block 44. The controller means 46 comprises a generally rectangular member 47 extending longitudinally from the front wall 21 to the back wall 25 and generally parallel to the side wall 23, 23'. The controller means 46 comprises a controller track means 48 for slidably connecting the controller means 46 to the side wall 23, 23' of the lower bin 18. The controller track means 48 provides linear movement of the controller means 46 axially along the lower bin 18. The controller track means 48 includes a plurality of slots 50 spaced along the member 47 which receive respective tabs or rails 52 extending radially outwardly from the side wall 23, 23' of the bin 18. The slots 50 provide a guide to travel along the rails 52 and allow the linear movement of the controller means 46 along the lower bin 18.

The locking means 42 further comprises crank means 54 interconnecting the controller means 46 and the locking block 44. The crank means 54 and the locking block 44 are disposed in a cavity 56 formed in the front wall 21 of the lower bin 18. The crank means 54 includes a crank shaft 58 generally circular and oblong in shape. The crank means 54 further includes a first connecting rod 60 interconnecting the crank shaft 58 with the controller means 46 and a second connecting rod 62 interconnecting the crank shaft 58 with the locking block 44. The first 60 and second 62 connecting rods are spaced apart and on opposite sides of the crank shaft 58 and extend outwardly therefrom and generally parallel to the front wall 21. Further, the first connecting rod 60 extends outwardly from a lower lobe portion L of the crank shaft 58 and pivotally connects to the controller means 46 by a pivot 79. The second connecting rod 62 extends outwardly from an upper lobe portion U of the crank shaft 58 and integral connects with the first pivot portion 45 of the locking block 44. The second connecting rod 62 further extends from the opposite side of the crank shaft 58 to a pivot support 65. As is commonly known in the art, a crank shaft assembly similar to that shown transfers movement from one axis to another. In accordance with the subject invention, the crank means 54 transfers the linear movement of the controller means 46 to the pivotal movement of the locking block 44 for engagement with the latch means 40. The connecting rods 60, 62 are further pivotally support by support means 64 within the cavity 56 to the lower bin 18.

The locking means 42 further comprises camming means 66 interacting between the bracket means 26 and the controller means 46. The camming means 66 transfers the rotational movement of the lower bin 18 and armrest assembly 10 to linear movement of the controller means 46. The bracket means 26 includes support portion 29, 29' and the guide member 30 sits against each support portion 29, 29' between the bracket means 26 and the lower bin 18 as previous described. The guide member 30 comprises an arcuate outer edge 68 forming a generally arcuate guide path. The guide member 30 is interlocked to the bracket means 26 through apertures 70, 70'. Further, the guide member 30 includes the arcuate slot 32 and the bin 18 includes the guide pin 34 seated in the slot 32 to rotatably guide the bin along the guide member 30, as previously described hereinabove, and further following the arcuate guide path formed by the arcuate outer edge 68. The camming means 66 comprises a guide follower 72 pivotally connected about a pivot pin P to the lower bin 18 and positioned above and adjacent the arcuate outer edge 63 of the guide member 30. The guide follower 72 sweeps a path corresponding to the arcuate guide path of the guide member 30 upon rotation of the lower bin 18 from the horizontal use position to the vertical storage position. That is, the pivot point P of the guide follower 72 travels along an arcuate path respective to the guide pin 34 in the guide means 30. The support portion 29, 29' of the bracket means 26 further includes an upper arcuate rail 74. The guide follower 72 includes an outwardly projecting lobe 76 further following the arcuate guide path and abutting against the rail 74 in the horizontal use position. The guide follower 72 sits inside of the bracket means 26, however, the lobe 76 extends out to the bracket means 26 for alignment with the rail 74.

The controller means 46 has a first end 78 connected by the pivot 79 to the first connecting rod 60 of the crank means 54 and a second end 80 in abutment with the guide follower 72. The second end 80 is offset slightly, as shown at 81, with respect to the rest of the member 47 so that the end 80 aligns with the side of the guide follower 72 and comes into contact therewith. The controller means 46 further includes spring bias means 82, generally a coil spring, interconnected between the controller means 46 and the side wall 23, 23' of the lower bin 18 for urging the controller means 46 toward the guide follower 72.

The latch means 40 comprises a prong 84 extending radially outwardly from the upper cover 22 for latching the cover 22 to the lower bin 18. The prong 84 is received in an aperture 86 disposed in the front wall 21 of the lower bin 18 and extending to the cavity 56. The prong 84 includes a pair of outwardly extending resilient distal tips 88, 88'. The width between the tips 88, 88' is slightly greater than the width of the aperture 86 and therefore, the distal tips 88, 88' flex inwardly upon passing through the aperture 86 and extend outwardly thereafter to lock the prong 84 in the cavity 56 and thus, latch the cover 22 to the lower bin 18 in the latched position.

In operation, as shown in FIGS. 2 and 3, the armrest assembly 10 is in the horizontal use position and the latch means 40 is in the unlatched position to allow the upper cover 22 to be pivoted about the lower bin 18 to the open position opening the storage compartment 20. In this position, the lobe 76 of the guide follower 72 is urged against the arcuate rail 74 of the frame 28 of the bracket means 26, forcing the controller means 46 to extended forward along the track means 48 towards the front wall 21. The lower lobe L of the crank shaft 58 is pressed forward, thus rotating the second connecting rod 62 to pivot the locking block 44 downwardly and the second portion 45' away from the aperture 86. As shown in hidden lines in FIGS. 5 with the prong 84 seated in the aperture 86 and thus the upper cover 22 covering the lower bin 18 in the latched position, the locking block 44 is pivoted away from the distal tips 88, 88' of the prong 84 in an unlocked position so that the cover 22 may be freely unlatched from the bin 18 to access the storage compartment 20. However, as shown in FIG. 4, upon rotation of the armrest assembly 10 from the horizontal use position toward the vertical storage position, the guide follower 72 follows along the arcuate path of the guide member 30 and eases away from the arcuate rail 74 of the bracket means 26. Since the spring bias means 82 urges the controller means 46 toward the guide follower 72, the controller means 46 slides along the controller track means 48 in a linear direction along the side wall 23, 23' of the lower bin 18 from the front wall 21 toward the back wall 25. This linear movement rotates the lower lobe L of the crank shaft 58 rearwardly, thus rotating the second connecting rod 62 in a counter clockwise direction and accordingly, the locking block 44 pivots upwardly and the second portion 45' is inserted between the distal tips 88, 88', of the prong 84. The locking block 44 fits snugly between the tips 88, 88' and thus prevents the distal tips 88, 88' from being flexed inwardly and thus, they can not pass through the aperture 86.

Turning to FIGS. 6 and 7, the predetermined position upon which the locking means 42 engages the latch means 40 and locks the cover 22 to the lower bin 18 is established very near the horizontal use position. This actuation is established by the alignment of the guide follower 72 with upper rail 74 of the bracket means 26. As can be seen, the lobe 76 sits forward on the guide follower 72, and thus the lobe 76 comes into contact with the arcuate rail 74 before the guide follower 72 has rotated its full distance to the horizontal use position. The arcuate rail 74 thus provides a stop against the lobe 76, however, since the guide follower 72 is pivotally coupled to the lower bin 18 it is allowed to rotate and continue the remaining arcuate distance of travel. Thus, in the unlatched position the guide follower 72 sits at an angle to the second end 80 of the controller means 46 creating a gap G therebetween. As shown in FIG. 6 upon initial movement of the armrest assembly 10 toward the vertical storage position, the guide follower 72 pivots about the lower bin 18, however, the lobe 76 initially remains in contact with the arcuate rail 74 of the frame 28. Thus, a camming action occurs between the rail 74 and lobe 76 and allows the gap G between the guide follower 72 and the second end 80 of the controller means 46 to close and the surfaces become flush to one another. In other words, the camming occurs upon rotation from the horizontal position with the guide pin 34 seated in the enlarged opening 36 of the guide member 30 to the predetermined position with the pin 34 moving a distance M along the arcuate slot 32. The lobe 76 is guided along the rail 74 and remains in sliding contact therewith upon rotation of the distance M. The camming action, by force of the spring 82, rotates the guide follower 72 to close the gap G and actuate the controller means 46. Closing this gap actuates the controller means 46 and thus the crank means 54 and creates the rotation of the locking block 44 into the distal tips 88, 88' of the prong 84. Thus, the locking means 42 is actuated upon this minimal rotational movement of the lower bin 18 closing the gap G between the guide follower 72 and the second end 80 of the controller means 46. Upon further rotation of the lower bin 18, the guide follower 72 follows the arcuate path along the guide member 30 and the locking block remains in the prong 84 to maintain the latch means 40 in the latched position.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A vehicle seat armrest assembly (10) comprising: a lower bin (18) defining a storage compartment (20); an upper cover (22) for covering said lower bin (18); a cover hinge means (24) hinging said cover (22) to said bin (18) for pivotal movement of said cover (22) relative to said bin (18) between a closed position covering said bin (18) and an open position opening said storage compartment (20); bracket means (26) supporting said lower bin (18) for providing rotation of said bin (18) between a horizontal use position and a vertical storage position;

latch means (40) for latching said cover (22) to said lower bin (18) in a latched position and allowing opening of said cover (22) in an unlatched position; said assembly characterized by including locking means (42) interacting between said bracket means (26) and said latch means (40) for maintaining said latch means (40) in said latched position in response to pivotal movement of said bin (18) to a predetermined position above said horizontal use position toward said vertical storage position so that said cover (22) remains latched to said bin (18) in all positions above said predetermined position.

2. An assembly as set forth in claim 1 further characterized by said locking means (42) including a locking block (44) pivotally coupled to said bin (18) for interlocking engagement with said latch means (40) in response to said pivotal movement of said bin (18).

3. An assembly as set forth in claim 2 further characterized by said locking means (42) including controller means (46) disposed between said locking block (44) and said bracket means (26) for controlling said pivotal movement of said locking block (44).

4. An assembly as set forth in claim 3 further characterized by said locking means (42) including camming means (66) interacting between said bracket means (26) and said controller means (46) for transferring said rotational movement of said bin (18) to linear movement of said controller means (46).

5. An assembly as set forth in claim 4 further characterized by said locking means (42) including crank means (54) interconnecting said controller means (46) and said locking block (44) for pivoting said locking block (44) into engagement with said latch means (40) upon actuation of said controller means (46).

6. An assembly as set forth in claim 5 further characterized by said bracket means (26) including a frame (28) having support portions (29, 29') on opposite sides of said bin (18) and a guide member (30) seated against each of said portion (29, 29') and having an arcuate outer edge (68) forming a generally arcuate guide path.

7. An assembly as set forth in claim 6 further characterized by said camming means (66) including a guide follower (72) pivotally connected about a pivot pin (P) and positioned adjacent said arcuate outer edge (68) of said guide member (30) and following said arcuate guide path upon said rotation of said bin (18).

8. An assembly as set forth in claim 7 further characterized by said controller means (46) having a first end (78) connected to said crank means (54) and a second end (80) in abutment with said guide follower (72).

9. An assembly as set forth in claim 8 further characterized by said guide follower (72) including an outwardly projecting lobe (76) further following said arcuate guide path upon said rotation of said bin (18).

10. An assembly as set forth in claim 8 further characterized by said bracket means (26) including an arcuate upper rail (74) contacting said lobe (76) and actuating said controller means (46) upon said rotation of said bin (18).

11. An assembly as set forth in claim 9 further characterized by said controller means (46) including spring bias means (82) interconnected between said controlled means (46) and said bin (18) for urging said controller means (46) toward said guide follower (72).

12. An assembly as set forth in claim 10 further characterized by said controller means (46) including controller track means (48) slidably connecting said controller means (46) to said bin (18) for providing linear movement of said controller means (46) relative to said bin (18).

13. An assembly as set forth in claim 12 further characterized by said crank means (54) including a crank shaft (58), a first connecting rod (60) interconnecting said crank shaft (58) with said controller means (46) and a second connecting rod (62) spaced from said first connecting rod (60) and interconnecting said crank shaft (58) with said locking block (44) for transferring said linear movement of said controller means (46) to said pivotal movement of said locking block (44).

14. An assembly as set forth in claim 13 further characterized by said locking means (42) including support means (64) for supporting said first (60) and second (62) connecting rods to said lower bin (18).

15. An assembly as set forth in claim 14 further characterized by said latch means (40) including a prong (84) extending radially outwardly from said cover (22) for latching said cover (22) to said lower bin (18).

16. An assembly as set forth in claim 15 further characterized by said latch means (40) including an aperture (86) disposed in said bin (18) for receiving said prong (84) in said latched position.

17. An assembly as set forth in claim 16 further characterized by said prong (84) including outwardly extending resilient distal tips (88, 88') for flexing inwardly upon passing through said aperture (86) and expanding outwardly thereafter for latching said cover (22) to said bin (18) in said latched position.

18. An assembly as set forth in claim 17 further characterized by said locking block (44) pivotally received between said distal tips (88, 88') upon rotation of said bin (18) above said predetermined position to prevent said tips (88, 88') from flexing inwardly and passing through said aperture (86).

19. An assembly as set forth in claim 18 further characterized by said controller track means (48) including at least one slot (50) and at least one rail (52) received in said slot (50) to slidably couple said controller means (46) to said bin (18) and provide said relative linear movement therebetween.

20. An assembly as set forth in claim 19 further characterized by said guide member (30) including an arcuate slot (32) and said bin (18) including a guide pin (34) seated in said slot (32) to rotatably guide said bin (18) about said guide member (30).

21. An assembly as set forth in claim 20 further characterized by said armrest (10) including a front wall (21), side walls (23, 23') and back wall (25) defining said compartment (20).

22. An assembly as set forth in claim 21 further characterized by said front wall (21) defining a cavity (56) including said aperture (86) therein and said crank means (54) and said locking block (44) disposed in said cavity (56).

23. An assembly as set forth in claim 22 further characterized by said controller means (46) disposed along one of said side wall (23, 23') and extending from said front wall (21) to said bracket means (26) adjacent said back wall (25).

* * * * *